US012083693B2

(12) United States Patent
Kopelas et al.

(10) Patent No.: US 12,083,693 B2
(45) Date of Patent: Sep. 10, 2024

(54) BLADE STORAGE SYSTEM, SHAVING SYSTEM, AND A REFILLABLE SHAVING HEAD

(71) Applicant: BIC Violex S.A., Anoixi (GR)

(72) Inventors: Panagiotis Kopelas, Anoixi (GR); Nikolaos Chatzigrigoriou, Anoixi (GR)

(73) Assignee: BIC VIOLEX SINGLE MEMBER S.A., Anoixi (GR)

( * ) Notice: Subject to any disclaimer, the term of this patent is extended or adjusted under 35 U.S.C. 154(b) by 114 days.

(21) Appl. No.: 17/330,544

(22) Filed: May 26, 2021

(65) Prior Publication Data

US 2021/0387366 A1 Dec. 16, 2021

(30) Foreign Application Priority Data

Jun. 12, 2020 (EP) .................................... 20179733

(51) Int. Cl.

*B26B 21/40* (2006.01)
*B26B 21/22* (2006.01)
*B65D 83/10* (2006.01)

(52) U.S. Cl.

CPC .......... *B26B 21/4037* (2013.01); *B26B 21/22* (2013.01); *B26B 21/4018* (2013.01); *B26B 21/4075* (2013.01); *B65D 83/10* (2013.01)

(58) Field of Classification Search

CPC . B65D 83/10; B26B 21/4037; A61B 17/3215; A61B 17/3217

(Continued)

(56) References Cited

U.S. PATENT DOCUMENTS 2,256,543 A * 9/1941 Auerbach .............. B65D 83/10 30/40.2
2,363,908 A * 11/1944 Stampleman .......... B65D 83/10 30/40.2

(Continued)

FOREIGN PATENT DOCUMENTS

FR 2 805 197 8/2001
GB 1 295 262 11/1972

OTHER PUBLICATIONS

Extended European search report in European Application No. 20179733.9, dated Feb. 12, 2021 (10 pages).

(Continued)

*Primary Examiner* — Jason Daniel Prone
(74) *Attorney, Agent, or Firm* — Bookoff McAndrews, PLLC

(57) ABSTRACT

A blade storage system for a refillable shaving head including a guard and a cover movable with respect to the guard between a retaining position, in which the cover and guard are able to retain a blade between them and a releasing position. The blade storage system including: a dispensing portion configured to retainably connect the blade to the cover of the head, and a removing portion configured to disconnect the blade from the cover. The removing portion is configured to disconnect the blade from the cover by moving the blade with respect to the cover along a bearing direction, along which the cover is configured to bear on the blade during retention of the blade to the head, and/or the dispensing portion is configured to connect the blade to the cover by moving the blade with respect to the cover opposite to the bearing direction.

14 Claims, 7 Drawing Sheets

(58) Field of Classification Search
USPC .......................................................... 30/40.2
See application file for complete search history.

(56) References Cited

U.S. PATENT DOCUMENTS

| | | | | | |
|---|---|---|---|---|---|
| 2,520,481 | A * | 8/1950 | Tuerff | B65D 83/10 | 30/40.2 |
| 2,529,819 | A * | 11/1950 | Simon et al. | B65D 83/10 | 30/40.2 |
| 2,562,513 | A * | 7/1951 | Shnitzler | B65D 83/10 | 30/40.2 |
| 2,587,380 | A | 2/1952 | Paul | | |
| 2,622,322 | A * | 12/1952 | Mix | B65D 83/10 | 30/40.2 |
| 2,637,900 | A | 5/1953 | Thompson | | |
| 2,639,029 | A * | 5/1953 | Austin | B65D 83/10 | 30/40.2 |
| 2,643,452 | A * | 6/1953 | Fennelly | B65D 83/10 | 30/40.2 |
| 2,663,079 | A * | 12/1953 | Peterson | B65D 83/10 | 30/40.2 |
| 2,674,036 | A * | 4/1954 | Butlin | B65D 83/10 | 30/40.2 |
| 2,680,905 | A * | 6/1954 | Auerbach | B65D 83/10 | 30/40.2 |
| 2,726,444 | A | 12/1955 | Peltz et al. | | |
| 2,741,838 | A * | 4/1956 | Breazeale | B65D 83/10 | 30/40.2 |
| 2,886,888 | A | 5/1959 | Fiske | | |
| 2,889,076 | A * | 6/1959 | Van Schie | B65D 83/10 | 221/232 |
| 2,976,986 | A * | 3/1961 | Linn | B65D 83/10 | 206/356 |
| 3,131,806 | A * | 5/1964 | Tait et al. | B65D 83/10 | 30/40.2 |
| 3,215,309 | A * | 11/1965 | Holzwarth et al. | B65D 83/10 | 221/231 |
| 3,549,046 | A * | 12/1970 | Iten | B65D 83/10 | 206/355 |
| 3,696,915 | A * | 10/1972 | Douglas | B65D 83/10 | 30/40.2 |
| 3,760,938 | A * | 9/1973 | Ferrier, Jr. | B65D 83/10 | 30/539 |
| 3,834,018 | A * | 9/1974 | Dawidowicz | B65D 83/10 | 30/40.2 |
| 3,863,340 | A * | 2/1975 | Perry | B65D 83/10 | 30/50 |
| 3,941,243 | A * | 3/1976 | Yamada | B65D 83/10 | 206/359 |
| 3,958,692 | A * | 5/1976 | Pomfret | B65D 83/10 | 30/32 |
| 4,000,832 | A * | 1/1977 | Pentney | B65D 83/10 | 30/40.2 |
| 4,073,407 | A * | 2/1978 | Pentney | B65D 83/10 | 206/357 |
| 4,285,428 | A * | 8/1981 | Beddall | B65D 83/10 | 206/354 |
| 4,379,514 | A * | 4/1983 | Joffe | B65D 83/10 | 221/287 |
| 4,685,564 | A * | 8/1987 | Hills | B65D 83/10 | 206/468 |
| 4,715,120 | A | 12/1987 | McGready | | |
| 4,742,909 | A * | 5/1988 | Apprille, Jr. | B65D 83/10 | 30/40.2 |
| 4,789,080 | A * | 12/1988 | Iten | B65D 83/10 | 221/279 |
| 5,409,133 | A * | 4/1995 | Gringer | B65D 83/10 | 206/360 |
| 5,518,114 | A * | 5/1996 | Kohring | B65D 83/10 | 30/40 |
| 5,937,522 | A | 8/1999 | Althaus et al. | | |
| 8,584,848 | B1 * | 11/2013 | Lee | B65D 83/10 | 30/40 |
| 9,302,844 | B1 * | 4/2016 | Gringer | B65D 83/10 | |
| 10,188,189 | B1 * | 1/2019 | McNally | B26B 21/4037 | |
| 10,315,833 | B2 | 6/2019 | Erdmann et al. | | |
| 2019/0307481 | A1 * | 10/2019 | Quek | A61B 17/3217 | |
| 2022/0126469 | A1 * | 4/2022 | Huang | B26B 21/4037 | |

OTHER PUBLICATIONS

"The Single Edge 2.0." Supply, https://supply.co/products/the-single-edge-razor?utm_source=facebook&utm_medium=paid&utm_content=CTC+FBCTC+-+WW+-+Prospecting+-+CBO+-+CC%24&utm_campaign=11%2F8+-+Business+Class+Stack&fbclid=lwAR2gPCJ0MyC_mxaLJzyuyBtlv_V0la1ZyGuodwYi5M7cgl9WQfgxNoMUIGE (retrieved May 25, 2021).

* cited by examiner

BLADE STORAGE SYSTEM, SHAVING SYSTEM, AND A REFILLABLE SHAVING HEAD

This application claims benefit from European patent application EP 20 179 733.9 filed on Jun. 12, 2020, its content being incorporated herein by reference.

FIELD

The present disclosure relates to the field of shavers, such as refillable shavers in which a handle and a blade are removably connectable to one another so that one may be replaced while conserving the other, and a shaving system therefor.

BACKGROUND

Most modern shavers include a head, including a cover and a guard for retaining a blade in the head, and a handle for manipulating the head and blade on skin during shaving. Cartridge-type heads are popular, due to the convenience of having the blade permanently retained therein. Over time, however, a user may need to replace the shaver's blade.

In so-called disposable shavers, the handle is permanently attached to the blade, which forces a user to replace the handle and head simultaneously with the blade, even if the head and/or handle may still be suitable for further use. In so-called refillable cartridge-type shavers, the head is removable from the handle, allowing a user to conserve the handle for further use. Nevertheless, the user is still required to replace the entire head (including its cover and guard) in order to replace the blade, even though the cover and/or guard may still be suitable for further use. In both cases, discarding more than just the blade represents a significant waste of material resources. Additionally, separation of the blade from the cartridge may be difficult, making recycling of cartridges dangerous and/or uneconomical.

U.S. Pat. No. 2,726,444 discloses a shaving system allowing a user to replace the shaver's blade by inserting the shaver's head into a blade storage device, causing the blade to slide with respect to the head's cover and guard in a direction parallel to the blade's cutting edge.

U.S. Pat. No. 2,587,380 discloses a shaving system allowing a user to replace the shaver's blade by connecting the shaver's head to a blade storage device and sliding the blade with respect to the head's cover and guard in a direction parallel to the blade's cutting edge.

U.S. Pat. No. 2,637,900 discloses a shaving system allowing a user to replace the shaver's blade by maneuvering the head's guard with respect a blade storage device to dis/connect the blade and guard.

In all of these systems, the user is able to conserve the head's guard and cover while replacing the blade. This is due to the fact that the shavers disclosed in these documents are refillable shavers in which the blade is removable from the guard and cover. However, these systems are complicated and unwieldy, and require the user to exert forces on small components in close proximity to dangerous cutting edges. There is therefore a need for a better and safer way to replace a shaver's blade.

SUMMARY

According to an example of the present disclosure, a refillable head may be provided, including a guard and a cover movable with respect to the guard between a retaining position and a releasing position. The cover and guard are able to retain a blade between them in the retaining position. The cover is configured to remove the blade from the guard during movement from the retaining position to the releasing position.

The head may allow removal of the blade from the head when the cover and guard are in the releasing position.

The cover may be hingedly connectable to the guard.

The head may include a latch mechanism which is engageable to maintain the guard and cover in the retaining position, and releasable to allow the cover and guard to move into the releasing position.

The head may include a retaining position recess for stabilizing the cover and guard with respect to one another in the retaining position.

The head may include a spring-loaded pin for engaging the retaining position recess when the cover and guard are in the retaining position.

The head may include a chamfer arranged in a vicinity of the retaining position recess so as to cooperate with the spring-loaded pin while the cover is moved into the retaining position with respect to the guard.

The cover may be configured to apply the blade to the guard during movement from the releasing position to the retaining position.

The cover may be detached from the guard when the guard and cover are in the releasing position, and attached to the guard when the guard and cover are in the retaining position.

The head may include one or more positioning features on the cover configured to cooperate with one or more corresponding positioning features on the blade.

The blade may be locatable with respect to the cover in the releasing position.

The one or more positioning features on the cover may include at least one magnet for magnetically retaining the blade with the cover and/or wherein the cover is snap-fittably retainable with the blade.

According to an example of the present disclosure, a shaver may be provided comprising a head as described earlier herein and a handle permanently or removably connectable thereto.

According to an example of the present disclosure, a blade may be provided. The blade is for a head as described earlier herein. The blade is retainable between the cover and the guard of the head. The blade includes one or more positioning features for cooperating with one or more positioning features on the cover such that the blade is locatable with respect to the cover when the cover is in the releasing position.

According to an example of the present disclosure, a blade storage device may be provided for a head as described earlier herein. The storage device includes a dispensing portion and a removing portion. The dispensing portion is configured to retainably connect the blade to a cover of the head. The removing portion is configured to disconnect the blade from the cover.

The removing portion is configured to disconnect the blade from the cover by moving the blade with respect to the cover along a bearing direction, along which the cover is configured to bear on the blade during retention of the blade to the head. Additionally or alternatively, the dispensing portion is configured to connect the blade to the cover by moving the blade with respect to the cover opposite to the bearing direction.

The removing portion may be configured to move the blade substantially perpendicularly to an edge direction, along which cutting edge of the blade is arranged, when disconnecting the blade from the cover.

The dispensing portion may be configured to move the blade substantially perpendicularly to the edge direction when connecting the blade to the cover.

The dispensing portion may include a carriage movable between a retrieving position and a presenting position. The carriage may be arranged in a storage portion of the storage device in the retrieving position. The carriage may be withdrawn from the storage portion in the presenting position. The storage device may be configured to apply the blade onto the carriage in response to the carriage entering the retrieving position.

The removing portion may include a separator mechanism movable between a receiving position and a removing position. The cover of the head and the blade connected thereto may be receivable by the removing portion in the receiving position. The separator mechanism may prevent connection between the blade and the cover in the removing position.

The separator mechanism may be arranged to penetrate the cover in the removing position.

According to an example of the present disclosure, a shaving system may be provided. The shaving system includes a head as described earlier herein, a blade storage device, and one or more blades.

According to an example of the present disclosure, a method of replacing an old blade of a shaver with a new blade may be provided. The method uses a blade storage device as described earlier herein, and includes discarding the old blade into the removing portion of the storage device by disconnecting the old blade from a cover, to which the old blade is connected, of a head of the shaver, and retainably connecting the new blade to the cover. The old blade is disconnected by moving the old blade relative to the cover in a bearing direction. The new blade is retainably connected to the cover by moving the new blade and the dispensing portion of the storage device relative to the cover opposite to the bearing direction. The cover is configured to bear on the old blade along the bearing direction during retention of the old blade within the head. The cover is configured to bear on the new blade along the bearing direction during retention of the new blade within the head.

BRIEF DESCRIPTION OF THE DRAWINGS

The disclosure may be more completely understood in consideration of the following detailed description of aspects of the disclosure in connection with the accompanying drawings, in which.

Figure 1:
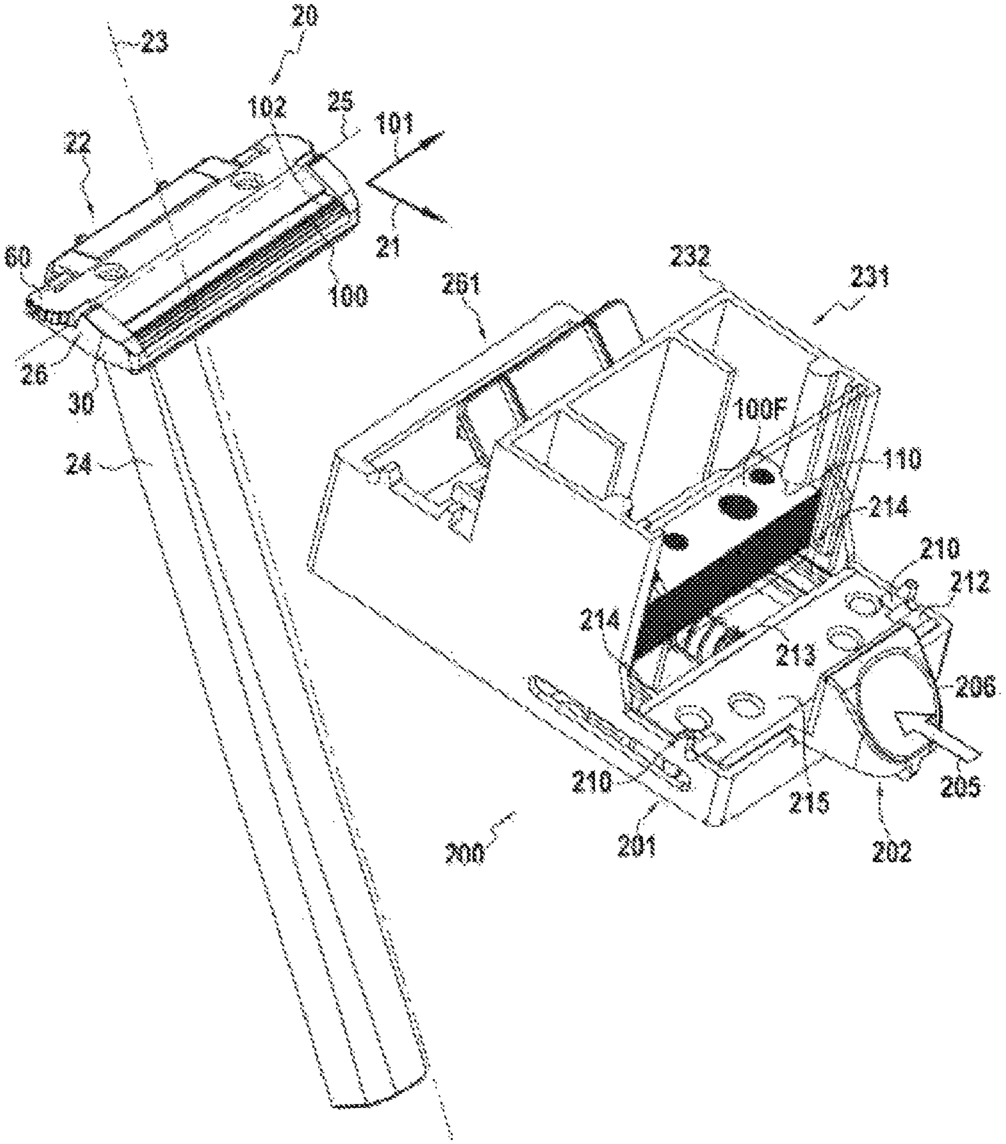
FIG. 1 shows an exemplary shaving system including an exemplary blade storage device and an exemplary shaver with an exemplary refillable shaving head and an exemplary blade.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (for example, "between" versus "directly between," "adjacent" versus "directly adjacent," etc.).

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

FIG. 1 shows an exemplary shaving system 0 including an exemplary shaver 20 and an exemplary blade storage device 200. The storage device 200 will be discussed in greater detail with regard to FIG. 6-12.

The shaver 20 includes an exemplary shaving head 22 which is configured to retain one or more razor blades 100 therein. The head 22 is refillable, such that a user may conserve it while replacing the blade(s) 100. For simplicity, a single razor blade 100 is shown.

In a conventional manner, the blade 100 includes a cutting edge 102 arranged along an edge direction 101 of the blade, the head 22 is intended to be maneuvered on the skin in a so-called shaving direction 21 during shaving, and the head is configured to retain the blade such that the shaving direction is perpendicular to the edge direction of the blade. The blade 100 may be a single edge blade, for example.

In a conventional manner, the shaver may include a handle 24 which is connected removably or permanently to the head 22. The attachment of the head 22 with the handle 24 may be configured to provide pivoting in one or more axes. The handle 24 may extend along a longitudinal axis 23 of the shaver 20. The longitudinal axis 23 of the shaver 20 may be perpendicular to the shaving direction 21 and/or the edge direction 101.

The shaver 20 is refillable, meaning that a user may conserve at least a portion of the shaver while replacing at least another portion of the shaver. More specifically, the present shaver's head 22 is refillable, meaning that the user may conserve at least the head while replacing the blade 100.

The head 22 includes a guard 30 and a cover 60 which are shown in a retaining position with respect to each other. In the retaining position, the guard 30 and cover 60 cooperate to retain the blade 100 between them. In a conventional manner, the guard 30 and cover 60 leave the cutting edge 102 of the blade 100 at least partially exposed between them at a front portion of the head 22.

The head 22 includes a hinge 26 between the guard 30 and cover 60. The hinge 26 allows the guard 30 and cover 60 to move relative to one another about a hinge axis 25, which may be substantially parallel to the edge direction 102. The hinge axis 25 may be provided near front portions of the guard 30 and cover 60.

Figure 2:
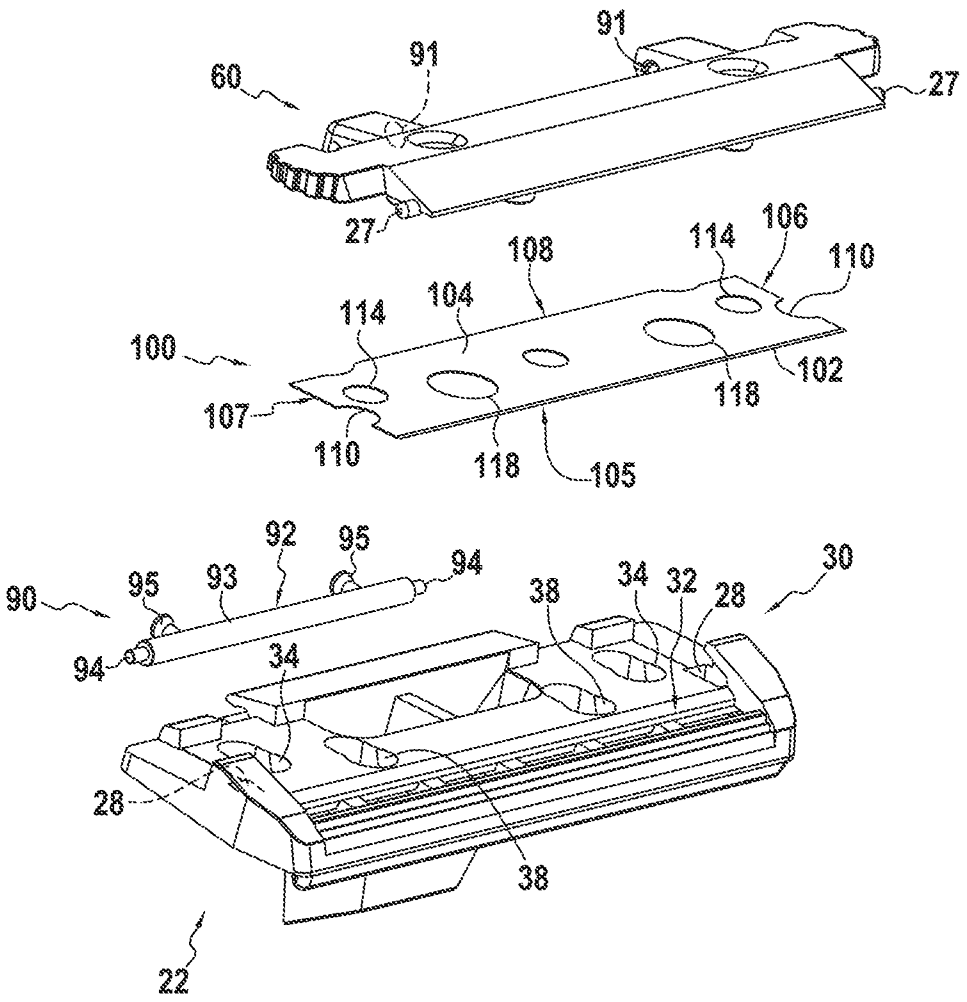
FIG. 2 shows the blade and head visible in FIG. 1 in an exploded view.

FIG. 2 shows the head 22 and blade 100 visible in FIG. 1 in an exploded view, as seen from the front portion of the head. The hinge can be seen to include a pair of hinge pins 27 provided on laterally-facing (with respect to the shaving direction) surfaces of the cover 60, and a pair of corresponding hinge recesses 28 provided on laterally-facing surfaces of the guard 30. It is also contemplated, as an alternative, for one or more hinge pins 27 to be provided on the guard 30, and one or more hinge recesses 28 to be provided on the cover 60.

Corresponding positioning features on the cover 60 and blade 100 allow the blade to be retained to the cover without being in contact with the guard 30. These positioning features will be discussed in greater detail with regard to FIG. 5. Because of this retention, the blade 100 rotates with the cover 60 as the cover rotates with respect to the guard 30 about the hinge axis. The guard 30 includes a cutting edge recess 32 into which the cutting edge 102 of the blade 100 may swing as the blade rotates with the cover 60.

In addition to its cutting edge 102, the blade 100 includes an upper surface 104 which is arranged towards the cover 60 when the cover and guard are in the retaining position, a lower surface 105 which is arranged towards the guard 30 when the cover and guard are in the retaining position, left 106 and right 107 lateral surfaces connecting the cutting edge and upper and lower surfaces together, and a rear surface 108 connecting the upper, lower, and lateral surfaces together. The blade 100 may have a thickness of approximately 0.05 to 1.3 mm (millimeters) as measured between its upper 104 and lower 105 surfaces, for example, or even 0.07 to 0.1 mm, for example.

The blade 100 can be removed when the guard 30 and cover 60 are placed in a releasing position. The head 22 may include a latch mechanism 90 which is engageable to maintain the guard 30 and cover 60 in the retaining position, and releasable to allow the cover and guard to move into the releasing position.

The latch mechanism 90 may be provided at a rear portion of the head 22. When the latch mechanism 90 is engaged, movement of the cover 60 with respect to the guard 30 (for example about the hinge axis when the cover and guard are hingedly connected to each other) may be limited or prevented.

The latch mechanism 90 includes a spring-loaded pin (also known as a spring bar) 92 which is fixed with respect to one of the cover 60 and the guard 30, and which is configured to cooperate with one or more retaining position recesses 91 on the other of the cover and the guard. In the present example, the spring-loaded pin 92 is fixed to the guard 30, and the retaining position recess(es) 91 are provided on the cover 60.

The spring-loaded pin 92 includes a main body 93 and a retractable, spring-loaded tip 94 that is mounted slidingly with respect to the body. In the present example, the body 93 is fixed to a rear portion of the guard, such that the spring-loaded tip(s) 94 of the pin is/are movable with respect to the guard 30.

The spring-loaded tip 94 is biased to extend along the spring-loaded pin's length, and is connected to an actuator 95 of the spring-loaded pin 92, which allows a user to retract the spring-loaded tip by overcoming the bias of its spring-loading. In the present example, the spring-loaded pin 92 includes two retractable, spring-loaded tips 94, which cooperate with two retaining position recesses 91 provided on a rear portion of the cover 60. As each spring-loaded tip 94 is retracted, it is made to withdraw from its corresponding retaining portion recess 91.

Figure 3:
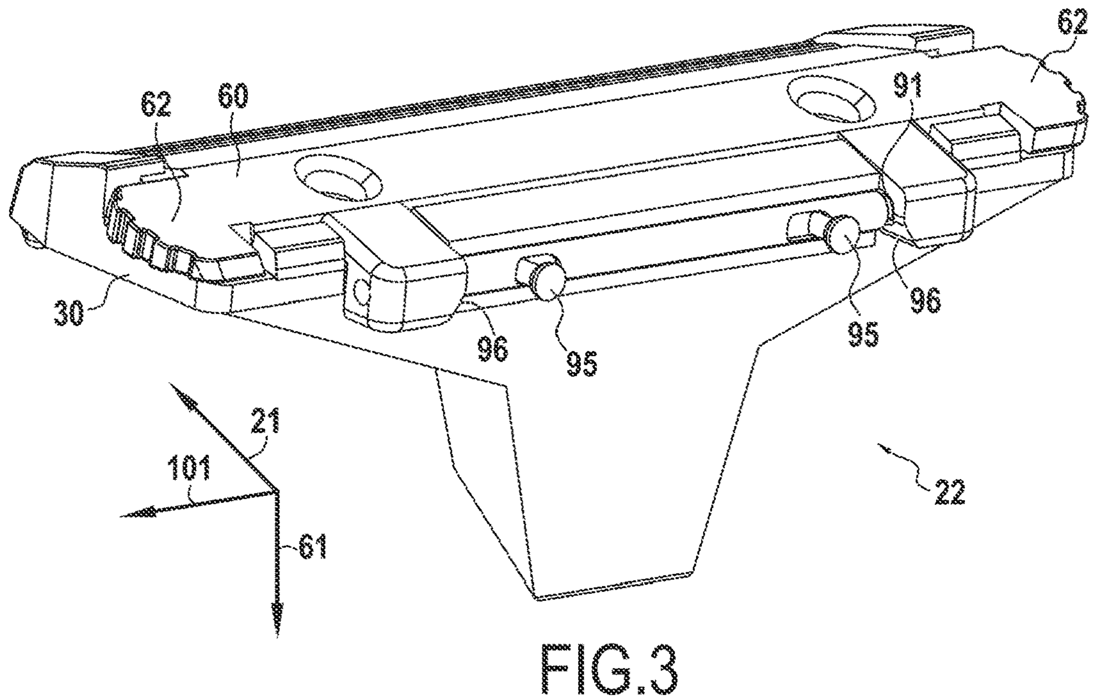
FIG. 3 shows the head of FIG. 2, with its guard and cover in a retaining position.

FIG. 3 shows the rear portion of the head 22 visible in FIG. 1. The actuators 95 are presented to extend from the rear portion of the head 22, away from the cutting edge of the blade, and are positioned such that a user may be able to bear on a first of the actuators with the thumb of one hand, and to bear on a second of the actuators with the forefinger of the same hand, so as to move the actuators towards one another, while gripping a handle connected to the head using the remaining fingers of the same hand.

When the cover 60 and guard 30 are in the retaining position, the cover is made to bear on the blade along a bearing direction 61 which is oriented perpendicular to the edge direction 101 and the shaving direction 21.

Figure 4:
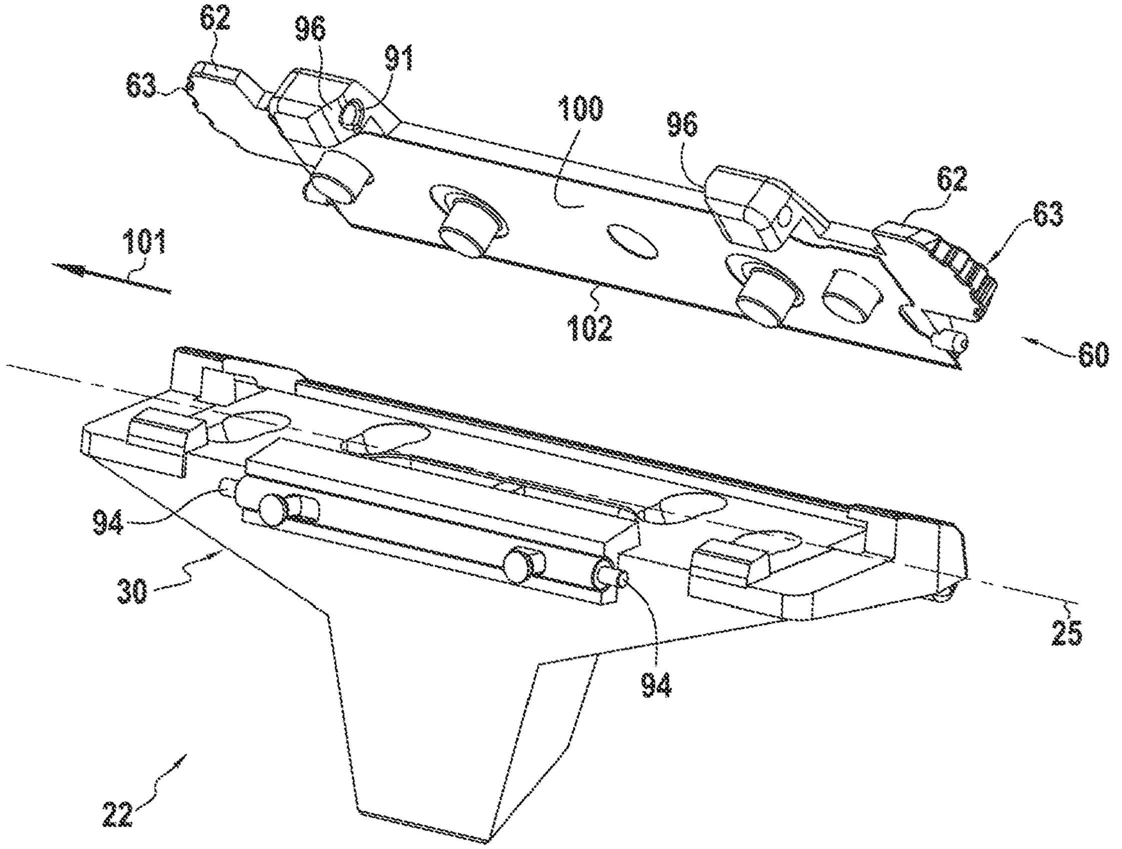
FIG. 4 shows the head of FIG. 3 during movement between the retaining position and a releasing position.

FIG. 4 shows the head 22 of FIG. 3 during movement between the retaining position and the releasing position. The cover 60 is shown rotated with respect to the guard 30 about the hinge axis 25, and the blade 100 is shown as having rotated with the cover. The cover 60 includes at least one lever 62 extending away from the cutting edge 102 of the blade 100. In the present example, two levers 62 are provided. Each lever 62 may be provided to extend beyond the nearest lateral surface of the blade 100 in the edge direction 101 when the blade is retained to the cover 60. As seen in FIG. 3, in the retaining position, the levers 62 may extend in the edge direction 101 beyond lateral extremities of the guard 30. Each lever 62 may additionally or alternatively extend in a direction perpendicular to the edge direction 101, away from the cutting edge of the blade.

The user may grip the lever(s) 62 while moving the cover 60 and guard 30 between the retaining and releasing positions. For example, the user may be able to place a thumb of one hand on a first of the two levers, and a forefinger of the same hand on a second of the two levers. For example, the hand whose thumb and forefinger are used for gripping the levers may be different from the hand whose hand and forefinger are used for bearing on the actuators as described above with regard to FIG. 3. As seen in FIG. 4, an outermost lateral extremity of each lever may be provided with a textured (or otherwise anti-slip) surface 63, for example to facilitate gripping of the levers between the thumb and forefinger of one hand. This texture may also serve as indicator for the user to hold the cover 60 by the two levers 62.

Figure 5:
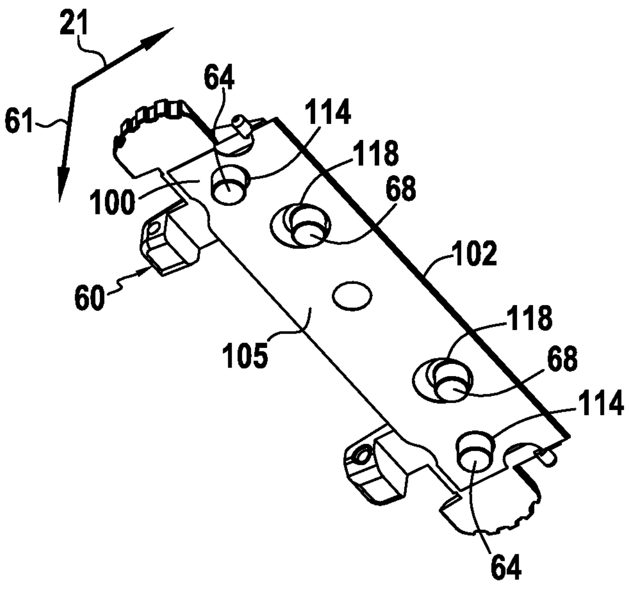
FIG. 5 shows the cover visible in FIG. 3.

The head 22 may be placed in the releasing position by disconnecting the cover 60 from the guard 30. FIG. 5 shows the cover 60 and blade 100 of FIG. 3 following disconnection of the cover from the guard. Because the cover 60 and blade 100 are retained to each other, the blade is removed from the guard when the cover and guard are disconnected from each other.

When the cover 60 and guard are placed in the retaining position, the blade 100, retained on the cover, is applied to the guard such that the lower surface of the blade bears on the guard.

Returning now to FIG. 2, the blade 100 can be seen to include at least one positioning feature. In the present example, the blade 100 includes multiple positioning features, of which at least one is configured to cooperate with the cover 60 such that the blade can be retained to the cover without being in contact with the guard 30. This cooperation will be discussed in greater detail later with regard to FIG. 5.

The blade 100 may include at least one notch 110 on one or more of its lateral surfaces 106, 107. In the present example, each lateral surface 106, 107 is shown to include a notch 110 extending lengthwise between the blade's upper 104 and lower 105 surfaces. Each notch 110 may be rounded in profile (perpendicular to its length), for example.

The blade 100 may include at least one hole traversing its upper 104 and lower 105 surfaces. In the present example, the blade 100 includes a two lateral pairs of holes 114, 118.

The lateral pairs of holes 114, 118 each include a relatively large hole 118 arranged forwards of the notch(es) 110 and a relatively small hole 114 arranged rearwards of the notch(es). The relatively small hole 114 may be arranged between its pair's relatively large hole 118 and the nearest lateral surface 106, 107 of the blade 100.

In FIG. 5, the blade 100 can be seen to be retained to the cover 60 without contact between the blade and the guard. As an example, the cover 60 can be seen to include at least one projection which is configured to penetrate a hole in the blade 100. In the present example, the cover 60 includes two pairs of projections 64, 68 which cooperate in a penetrating manner with the lateral pairs of holes 114, 118 in the blade 100. When the projection(s) 64, 68 and hole(s) 114, 118 are arranged in a penetrating manner inside each other, the blade 100 is positioned such that the cutting edge 102 is arranged at the front portion of the cover 60.

As an example, the blade 100 may be ferromagnetic, and retainable to the cover 60 via a magnet housed in the cover. Additionally or alternatively, at least one projection 64, 68 of the cover 60 may be friction-fittable within its corresponding hole 114, 118 of the blade 100. In the present example, each pair of projections includes a forward projection 68 which is configured to apply a force to the blade 100 in the shaving direction 21, and a rear projection 64 which is configured to apply a force to the blade opposite to the shaving direction, such that collectively the pair of projections is friction-fittable within the blade. Additionally, it is contemplated for at least one of the projections 64, 68 of the cover to include deformable portion to bear on the lower surface 105 of the blade 100 when the blade is retained to the cover 60, such that the blade is snap-fittable to the cover. As the blade 100 is attached or detached from the cover 60, the blade may deform the deformable portion in a direction perpendicular to the bearing direction 61.

When the blade 100 is retained to the cover 60 and the projection(s) 64, 68 penetrate in the hole(s) 114, 118, the projections can be seen to protrude from the lower surface 105 of the blade. Returning now to FIG. 2, the guard 30 can be seen to include at least one hole 34, 38, corresponding to the projection(s) of the cover 60. When the cover 60 and guard 30 are placed in the retaining position, the projection(s) of the cover penetrate in the hole(s) 34, 38 of the guard. When the blade 100 is retained to the cover 60 and the projection(s) of the cover penetrate in the hole(s) 34, 38 of the guard 30, the cover becomes positioned with respect to the guard such that the cutting edge 102 of the blade is positioned between the cover and guard and is available for shaving. Each of the holes 34, 38 is provided in a corresponding pocket which allows the corresponding projection 64, 68 of the blade 100 to swing therethrough as the cover 60 moves about the hinge axis.

The cover 60 and guard 30 can be placed in the retaining position by connecting their hinge pins 27 and hinge recesses 28 together to form the hinge, and by rotating the cover around the cover about the hinge axis until the retaining position recess(es) 91 and the spring-loaded tip(s) 94 of the latch mechanism 90 are aligned. As seen in FIGS. 3 & 4, one or more chamfers 96 may be provided on the cover 60 in a vicinity of the retaining position recess(es) 91, such that the chamfer(s) 96 is/are in the bearing direction 61 with respect to the retaining position recess(es) 91. The chamfer(s) 96 may be inclined with respect to the bearing direction 61 and the length of the spring-loaded pin 92, such that the chamfer(s) 96 recede(s) from the spring-loaded pin 92 in a direction parallel to the length of the spring-loaded pin 92 as distance from retaining position recess(es) 91 increases along the bearing direction 61. When multiple chamfers 96 are provided, they may define a region into which the spring-loaded pin 92 is insertable perpendicular to a length thereof, the region narrowing in the length direction of the spring-loaded pin 92 as the cover 60 moves in the bearing direction 61 with respect to the guard 30. Contact between the chamfer(s) 96 and the spring-loaded tip(s) 94 may encourage retraction of the spring-loaded tip(s) during alignment of the retaining position recess(es) 91 with the spring-loaded tip(s). Additionally or alternatively, the actuator(s) 95 of the spring-loaded pin 92 may be activated to retract the spring-loaded tip(s) 94 during alignment with the retaining position recess(es) 91, and released to engage the latch mechanism 90.

Each hinge recess 28 includes one closed lengthwise extremity configured to contact the corresponding hinge pin 27 when the hinge pins are connected to the hinge recesses, and one open lengthwise extremity through which the corresponding hinge pin may pass while disconnecting the hinge pins from the hinge recesses. In the present example, the closed extremity is arranged in the shaving direction relative to the closed extremity of each hinge pin 27, such that the hinge pins and hinge recesses 28 may be connected to one another by sliding the cover 60 in the shaving direction 21 with respect to the guard 30, and may be disconnected from each other by sliding the cover opposite to the shaving direction with respect to the guard. In examples, the hinge pins 27 may be snap-fitted into the hinge recesses 28, via a relatively narrow portion arranged in the hinge recesses 28 intermediate the open and closed lengthwise extremities thereof. The cutting edge recess 32 of the guard 30 is sized to allow the blade 100 to translate with the cover 60 as the cover and guard are connected and disconnected from each other.

Returning now to FIG. 1, the storage device 200 can be seen to include a dispensing portion 201 (arranged towards the viewer) and a removing portion 261 (arranged away from the viewer). The dispensing portion 201 is configured to connect the blade 100 retainably to the cover 60. The removing portion 261 is configured to disconnect the blade 100 from the cover 60.

The storage device 200 includes a storage portion 231 connected to the dispensing portion 201, configured to hold one or more new blades 100F (for example razor blades which have not yet been used for shaving). Each new blade 100F may be identical to the blade seen in FIG. 2.

The dispensing portion 201 includes a carriage 202 which is movable with respect to the storage portion 231 for moving new blades between a retrieving position and a presenting position. Movement towards the retrieving position is performed by manipulation of an actuator 206 configured to be borne on by a user's finger in a direction indicated by accompanying arrow 205. The carriage 202 includes one or more positioning features which are configured to cooperate with one or more positioning features of each new blade 100F. For example, it can be seen that the carriage 202 includes at least one (in this case two) projections 210 corresponding to the notch(es) 110 of each new blade 100F.

Figure 6:
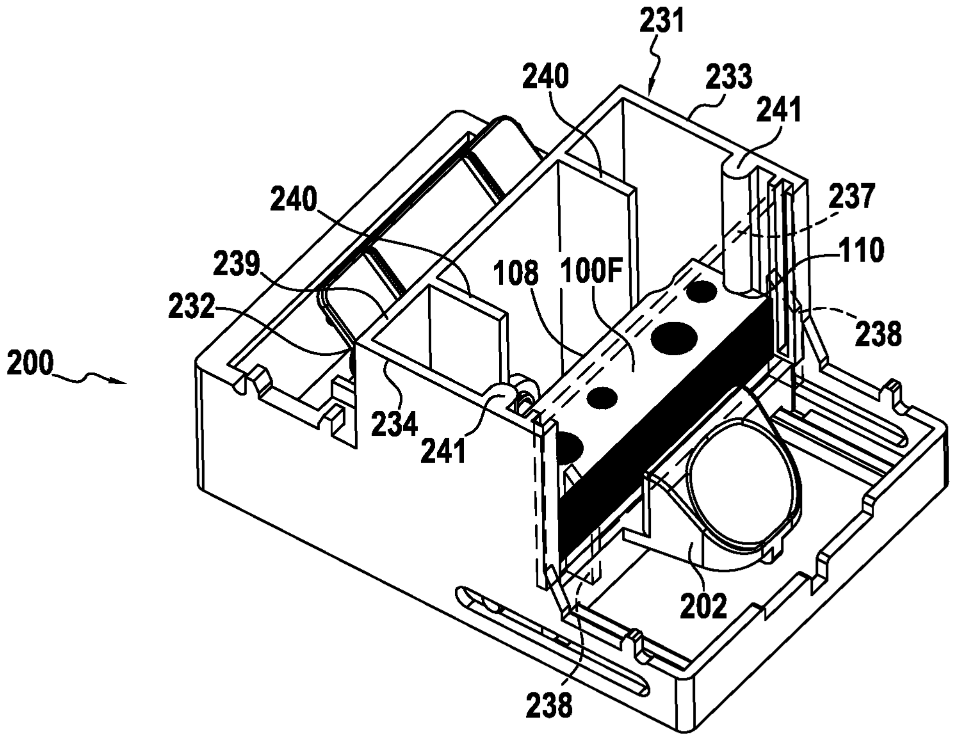
FIG. 6 shows the blade storage device visible in FIG. 1 in a retrieving position.

FIG. 6 shows the storage device 200 of FIG. 1 with its carriage 202 in the retrieving position. When the carriage 202 is moved into the retrieving position, the carriage enters into the storage portion 231 for new blades. The storage portion 231 for new blades is configured to apply one of the one or more new blades 100F stored therein to the carriage 202 such that the positioning features of the carriage and new blade(s) cooperate with one another.

The storage portion 231 for new blades is provided as a magazine 232 defined by a rear wall 239 arranged away from the carriage 202, a front wall 237 opposite the rear wall, and left 233 and right 234 lateral walls opposite each other and connecting the front and rear walls together. Each new blade 100F is dispensed from the magazine 232 by moving towards the carriage 202 when the carriage is inserted into the storage portion 231 for new blades.

A user may be able to observe the new blade(s) 100F contained in the magazine 232. For example, at least one wall of the magazine—the front wall 237 in the present example—may be transparent.

The front wall 237 may include one or more tabs 238 for guiding the cover 60 onto the carriage 202 to attach a new blade 100F to the cover.

The magazine 232 may include a lid to prevent new blades 100F from leaving the magazine in a direction opposite to the carriage 202, which may be permanently attached, or removably attached (for example with a friction or snap fit) to one or more of the front 237, rear 239, and lateral 233, 234 walls.

The magazine 232 may be gravity fed, with its lateral 233, 234 and front 237 and rear 239 walls oriented approximately vertically, such that each new blade 100F may be dispensed from a bottom of the magazine.

The magazine 232 may include one or more rear guide rails 240 (in the present example two rear guide rails) configured to contact the rear surface 108 of each new blade 100F guidingly. In the present example, the one or more rear guide rail(s) 240 run vertically along the rear wall 239 and extend towards the front wall 237 of the magazine 232.

The magazine 232 may include one or more lateral guide rails 241 configured to cooperate guidingly with the notches 110 of each new blade 100F. In the present example two lateral guide rails 241 are provided, one on each of the left and right lateral walls of the magazine. Each lateral guide rail is arranged such that new blades 100F are transported through the magazine in a direction that is substantially perpendicular to the blades' upper and lower surfaces. Each lateral guide rail 241 terminates at an extremity of the magazine 232 which is relatively near to the carriage 202.

Returning now to FIG. 1, the carriage 202 can be seen to include a tray 212 arranged to face and to receive one of the new blades 100F when inserted inside the magazine 232, and at least one guide rail 214 extending towards the magazine from the tray. In the present example, the two guide rails 214 are provided, and arranged to extend beneath the new blades 100F near their left and right lateral surfaces.

Each guide rail 214 of the carriage 202, at its junction with the tray 212, is arranged to protrude towards the new blades 100F relative to a floor 215 of the tray, where the at least one new blade 100F is arranged when the carriage 202 enters the storage portion 231 for new blades. In the present example, the tray 212 includes a rear lip 213 at its junction with the guide rails 214. The rear lip 213 is flush with the guide rails 214, and protrudes towards the new blades 100F with respect to the floor 215.

When the tray 212 is inserted in the magazine 232, the floor 215 of the tray is separated from the nearest extremity thereto of each lateral guide rail 241 of the magazine by a distance greater than or equal to the thickness of one new blade 100F. This separation allows the new blade 100F to separate from the lateral guide rail(s) 241 while moving towards the floor 215. The projection(s) 210 of the carriage 202 may be approximately flush with the extremity/ies of the lateral guide rail(s) 241. When the tray 212 has received the new blade 100F, a subsequent new blade (which will be received by the tray 212 the next time the tray enters the retrieving position), rests on the upper surface of the new blade received in the tray.

Figure 7:
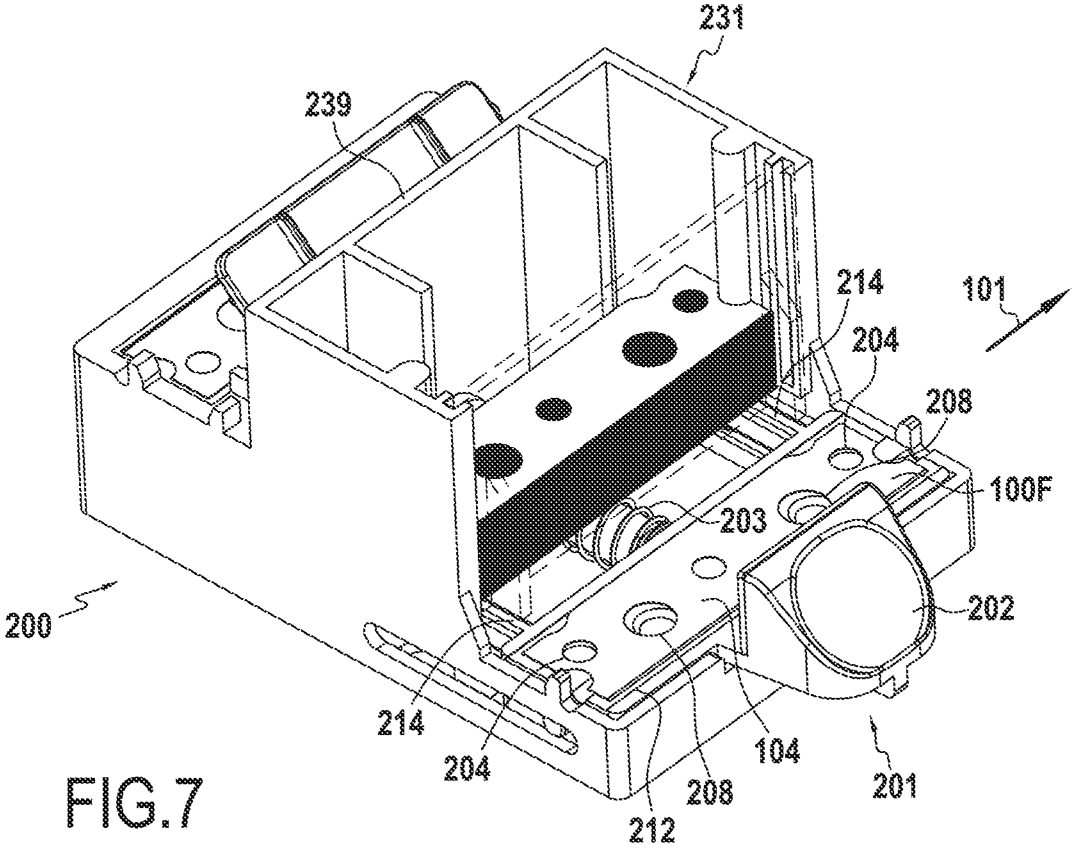
FIG. 7 shows the blade storage device of FIG. 6 in a presenting position.

FIG. 7 shows the storage device 200 of FIG. 6 with its carriage 202 in the presenting position. As the carriage 202 is moved from the retrieving position into the presenting position, the carriage withdraws from the storage portion 231 for new blades.

As the tray 212 is withdrawn from the magazine, the new blade 100F received thereby slides relative to the subsequent new blade. When the tray 212 is fully withdrawn from the magazine, the subsequent new blade rests on the guide rail(s) of 214 the carriage 202.

The dispensing portion 201 may include a carriage return mechanism 203 configured to bias the carriage 202 towards the presenting position. Alternatively, the carriage 202 may be biased towards the retrieving position. In the present example, the carriage return mechanism 203 is provided as a resilient member (for example a spring) arranged between the carriage 202 and the rear wall 239 of the storage portion 231 for new blades.

When the positioning features of the carriage 202 and the new blade 100F cooperate with one another, the carriage is able to transport the new blade, allowing the new blade to be removed from the storage portion 231 for new blades. Comparison of FIGS. 6 & 7 reveals that the dispensing portion 201 has moved the new blade 100F in a direction that is substantially perpendicular to the new blade's edge direction 101.

The upper surface 104 of the new blade 100F is visible.

Figure 8:
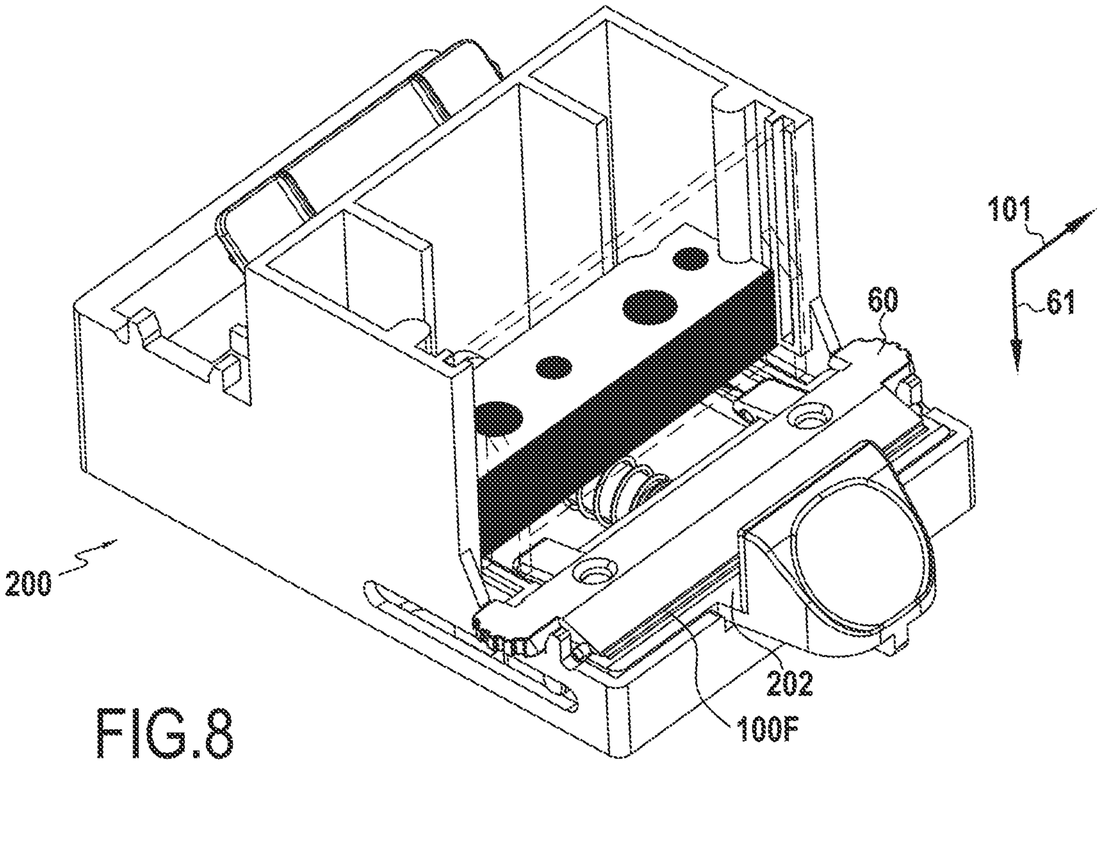
FIG. 8 shows the blade storage device of FIG. 7 during connection of a blade to a cover.

Comparison of FIGS. 7 & 5 reveals that the carriage 202 has one or more holes 204, 208 which correspond to the one or more projections of the cover. FIG. 8 shows the storage device 200 of FIG. 7 during connection of a new blade 100F to the cover 60 of the head.

To connect the new blade 100F to the cover 60, the cover is moved into position on the carriage 202, such that the projection(s) of the cover are aligned with the hole(s) of the carriage. The cover 60 lacks blades when being moved into position with respect to the carriage 202.

When the cover 60 is correctly positioned with respect to the carriage 202, the cover is moved towards the carriage such that the relative movement of the new blade 100F with respect to the cover is opposite the bearing direction 61. This movement is substantially perpendicular to the edge direction 101 of the new blade 100F—for example at 45° to 135° (degrees), or even 90° with respect to the edge direction 101. The projection(s) of the cover 60 and the holes of the new blade 100F and carriage 202 guide the cover into position with respect to the new blade until the cover bears on the upper surface of the new blade. The cover 60 and new blade 100F are thus connected and retained to each other.

After connecting the new blade 100F to the cover 60, the cover and new blade retained thereto can be removed from the storage device 200 and connected to the guard in the manner described previously, such that the cover and guard are in the retaining position with the new blade retained in the head.

Figure 9:
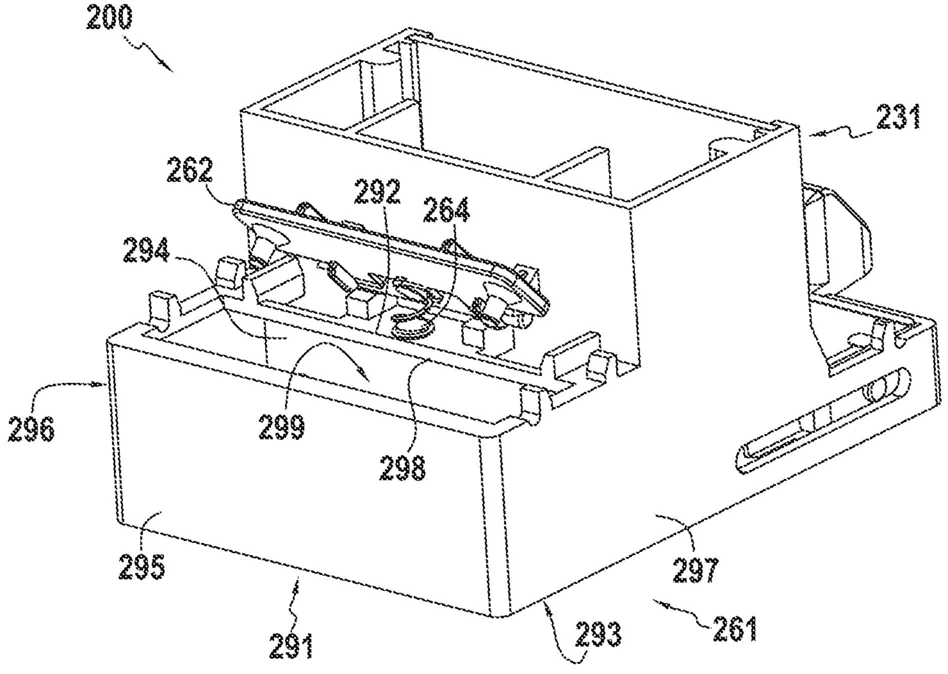
FIG. 9 shows the blade storage device of FIG. 8 with its separator mechanism in a receiving position.

FIG. 9 shows the storage device 200 of FIG. 1 with its removing portion 261 arranged towards the viewer. The removing portion 261 includes a storage portion 291, configured to hold one or more discarded blades (for example razor blades which have been used for shaving). Each discarded blade may be identical the blade seen in FIG. 2.

The storage portion 231 for new blades and the storage portion 291 for discarded blades may be connected to each other, for example with separate compartments to maintain segregation of discarded and new blades.

The storage portion 291 for discarded blades includes a top wall 292, a bottom wall 293 opposite the top wall, a front wall 294 connecting the top and bottom walls together, a rear wall 295 opposite the front wall and connecting the top and bottom walls together, and left 296 and right 297 lateral walls opposite each other and connecting the front and back and top and bottom walls together. A window 298 practiced in one of the walls (in this case the top wall 292) opens into a cavity 299 defined by all of these walls.

The removing portion 261 includes a separator mechanism 262 which is movable with respect to the storage portion 291 for discarded blades between a receiving position (visible in FIG. 9) and a removing position. When the separator mechanism 262 is in the receiving position, the cover and blade retained thereto are receivable in the removing portion 261.

The separator mechanism 262 may include a resilient element 264 configured to return the separator mechanism to a predetermined position. For example, the separator mechanism 262 may be biased to return to the receiving position. In this case, a lid may be provided to prevent discarded blades from exiting the cavity 299 through the window 298 while the removing portion 261 is not in use. However, it is also contemplated, as an alternative, for the separator mechanism 262 to be biased towards the removing position, such that the separator mechanism obstructs the window 298 while not in use.

Figure 10:
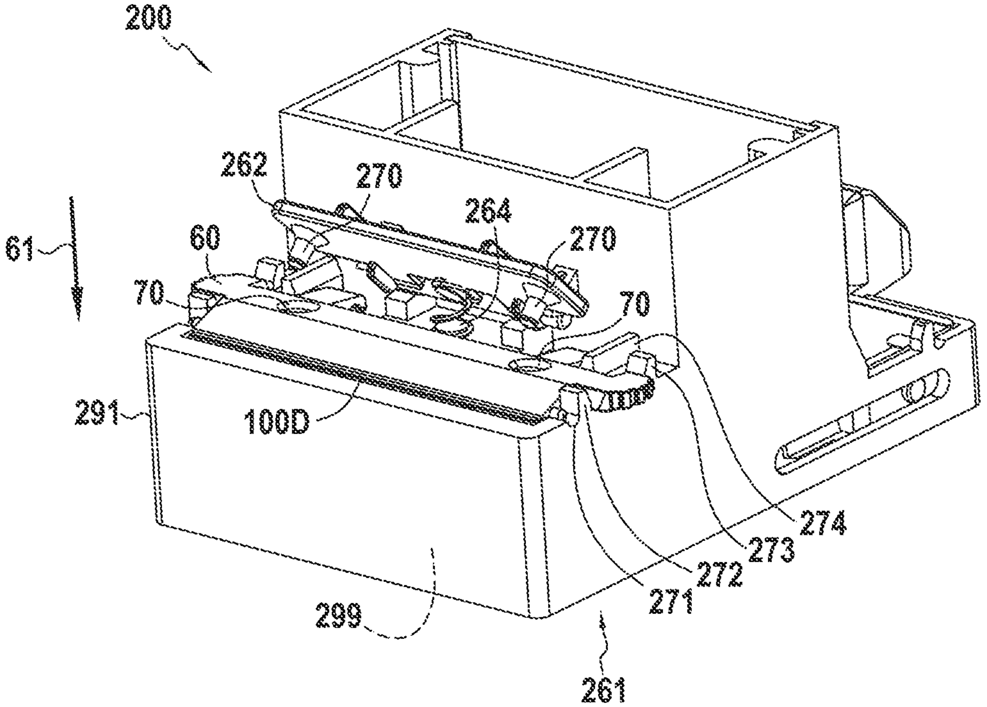
FIG. 10 shows the blade storage device of FIG. 9 with a head and blade received thereby, during movement of the separator mechanism between the receiving position and a removing position.

FIG. 10 shows the storage device 200 of FIG. 9 with a cover 60, which is attached to an old blade 100D which a user intends to discard. The old blade 100D may be a blade which the user has already used for shaving, for example. The user may remove the old blade 100D from the head by bearing on the actuator(s) of the spring-loaded pin in the manner described previously, and moving the cover 60 into the releasing position in the manner described previously. As the cover 60 and guard rotate relative to one another about the hinge axis, the cover, to which the old blade 100D is retained, separates the old blade from the guard. The cover 60 may be liberated from the guard by disengaging the hinge pins and hinge recesses, and be used to transport the old blade 100D to the storage device 200.

The cover 60 and old blade 100D connected thereto may be received in the removing portion 261. The removing portion 261 includes guide features 271-274 which guide the cover 60 (for example through guiding contact with the cover's rear portion and/or lever and/or hinge pins) into position such that the old blade 100D retained on the cover and the cover 60 itself are positioned in the window of the storage portion 291 for discarded blades. Although the present example is illustrated with the removing portion 261 as receiving the cover 60 and old blade 100D attached thereto such that the cutting edge of the old blade is arranged towards the rear wall of the removing portion, it is also contemplated for the removing portion to be configured to receive them such that the cutting edge is arranged towards the front wall of the removing portion.

Once the cover 60 and old blade 100D retained thereon are positioned, the separator mechanism 262 may be moved into the removing position.

In the present example the separator mechanism 262 is provided as a press that is hingedly connected to the window. A spring is provided as a resilient element 264 to bias the press to the receiving position.

The separator mechanism includes at least one protrusion 270 configured to insert itself between the cover 60 and old blade 100D when the separator mechanism 262 is in the removing position. Inserting the protrusion(s) 270 between the old blade 100D and cover 60 causes the old blade to move in the bearing direction 61 with respect to the cover, disconnecting therefrom in the process. Once the old blade 100D and cover 60 are disconnected from each other, the old blade passes from the window into the cavity for storage.

Figure 11:
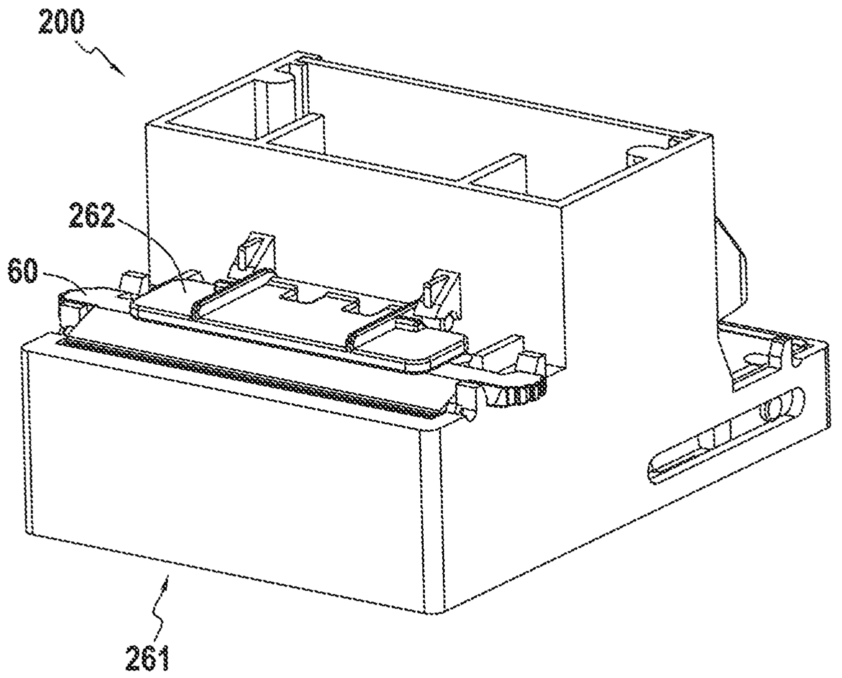
FIG. 11 shows the blade storage device of FIG. 10 with its separator mechanism in the removing position.

In the present example the at least one protrusion 270 is provided as a pair of pins, which can be seen to correspond to a pair of removal holes 70 practiced in the cover 60. As seen in FIG. 11, which shows the storage device 200 of FIG. 10 with its removing portion 261 in the removing position, the pins are configured to be inserted between the cover 60 and blade by penetrating the removal holes when the separator mechanism 262 is moved into the removing position.

Figure 12:
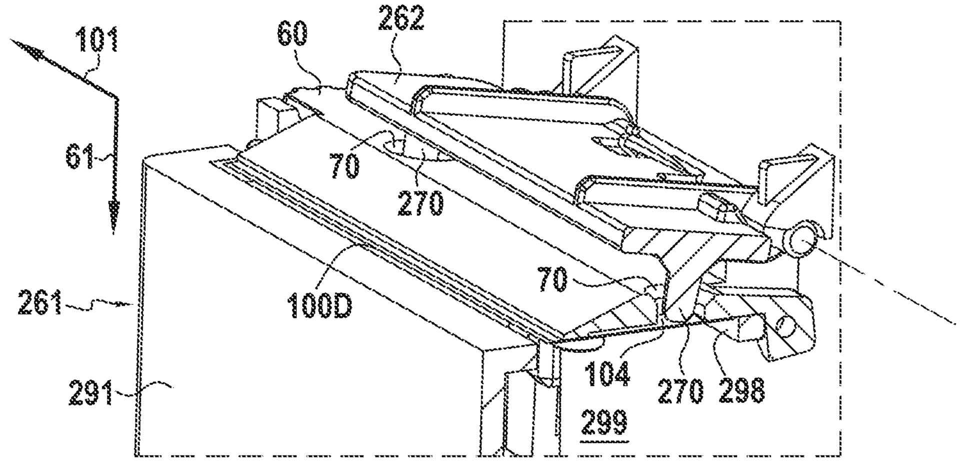
FIG. 12 shows a partial, sectional view of the blade storage device of FIG. 11.

FIG. 12 shows a partial sectional view of the removing portion 261 visible in FIG. 11. The removal holes 70 in the cover 60 are through-holes which allow the pins (protrusions 270) of the separator mechanism 262 to bear directly on the upper surface 104 of the old blade 100D retained by the cover. The pins press the old blade 100D in the bearing direction 61 of the cover 60, and drive the old blade 100D through the window 298 into the cavity 299 of the storage portion 291 for discarded blades, in a direction that is substantially perpendicular to the edge direction 101 of the blade (for example at 45° to 135°, or even 90° with respect to the edge direction 101). If the cover 60 is configured to retain the old blade 100D thereto through magnetic retraction, the pins are configured to drive the old blade in the bearing direction 61 a sufficient distance for magnetic retraction to be unable to reattach the old blade to the cover. In the present example, the pins are configured to separate the old blade 100D from the cover 60 by a distance of at least 5 mm in the bearing direction 61.

After disconnecting the old blade 100D from the cover 60, the cover may be provided with a new blade in the manner described previously. The cover and new blade may be reattached to the guard—thus the head is refilled while conserving the cover and guard—and used for shaving. Reattachment of the cover 60 with the new blade to the guard may be performed by aligning the hinge pins and hinge recesses with one another, and rotating the cover and guard relative to one another until the retaining position recesses and spring-loaded pin are aligned with one another in the manner described previously. As the cover and guard rotate relative to one another about the hinge axis, the new blade, which is retained with the cover, is brought to bear on the guard and is in turn borne on by the cover. When the cover and guard reach the retaining position, the blade bears on the guard and is borne on by the cover so as to be retained within the head.

Throughout the description, including the claims, the term "comprising a" should be understood as being synonymous with "comprising at least one" unless otherwise stated. In addition, any range set forth herein, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A blade storage system for a refillable shaving head, the refillable shaving head including a guard and a cover movable with respect to the guard between a retaining position and a releasing position, wherein the cover and the guard are configured to retain an old blade therebetween in the retaining position, and wherein the cover and the old blade are configured to release from the guard in the releasing position, the blade storage system including a storage device having:

a dispensing portion configured to store a plurality of blades and dispense, one blade at a time, a new blade of the plurality of blades, the dispensing portion including a carriage return mechanism configured to move a carriage between a presenting position and a retrieving position; and a removing portion including a surface defining a window and a separator press hingedly connected to the surface such that the separator press and the window cooperate to disconnect the old blade from the cover when the cover and the old blade are in the releasing position by moving the old blade with respect to the cover along a first direction; and wherein the carriage is configured to receive the new blade in the retrieving position and to receive the cover in the presenting position such that the new blade retainably connects to the cover when the cover is placed onto the new blade by moving the new blade with respect to the cover in a second direction opposite to the first direction.

2. The blade storage system of claim 1, wherein the first direction is substantially perpendicular to the surface defining the window.

3. The blade storage system of claim 1, wherein the carriage return mechanism is configured to bias the carriage towards the presenting position.

4. The blade storage system of claim 1, wherein the separator press includes at least one protrusion configured to be inserted between the cover and the old blade to disconnect the old blade from the cover when the cover and the old blade are in the releasing position.

5. The blade storage system of claim 1, the storage device further including a storage portion such that the plurality of blades are stored within the storage portion, wherein the carriage is arranged in the storage portion of the storage device in the retrieving position, and the carriage is withdrawn from the storage portion in the presenting position, and the storage device is configured to apply the new blade onto the carriage in response to the carriage entering the retrieving position.

6. The blade storage system of claim 1, wherein the separator press moves between a removing position when moving towards the window and a receiving position when moving away from the window, wherein the separator press and the window are configured to disconnect the old blade from the cover when the separator press is in the removing position, and wherein the removing portion is configured to receive the cover and the old blade when the separator press is in the receiving position.

7. A shaving system comprising:

a refillable shaving head including a guard and a cover movable with respect to the guard between a retaining position and a releasing position, wherein the cover and the guard retain an old blade therebetween in the retaining position, and wherein the cover and the old blade release from the guard in the releasing position; and a blade storage system including a storage device having:

a dispensing portion configured to store a plurality of blades and dispense, one blade at a time, a new blade of the plurality of blades, the dispensing portion including a carriage return mechanism configured to move a carriage between a presenting position and a retrieving position; and a removing portion including a surface defining a window and a separator press hingedly connected to the surface such that the separator press and the window cooperate to disconnect the old blade from the cover when the cover and the old blade are in the releasing position by moving the old blade with respect to the cover along a first direction; and wherein the carriage is configured to receive the new blade in the retrieving position and to receive the cover in the presenting position such that the new blade retainably connects to the cover when the cover is placed onto the new blade by moving the new blade with respect to the cover in a second direction opposite to the first direction.

8. The shaving system of claim 7, the refillable shaving head further including a latch mechanism which is engageable to maintain the guard and cover in the retaining position, and releasable to allow the cover and guard to move into the releasing position, wherein the latch mechanism is fixed to the guard and engages one or more retaining position recesses on the cover.

9. The shaving system of claim 7, the cover further including a retaining position recess.

10. The shaving system blade storage-system of claim 9, the refillable shaving head further including a spring-loaded pin for engaging the retaining position recess when the cover and the guard are in the retaining position, wherein the spring-loaded pin is fixed to the guard and engages the retaining position recess.

11. The shaving system of claim 10, the cover further including a chamfer so as to cooperate with the spring-loaded pin while the cover is moved into the retaining position with respect to the guard.

12. The shaving system of claim 7, the refillable shaving head further including one or more positioning features on the cover configured to cooperate with one or more corresponding positioning features on the new blade and/or the old blade when the cover and the new blade are in contact with one another and/or when the cover and the old blade are in contact with one another.

13. The shaving system of claim 7, further including a handle permanently or removably connectable to the refillable shaving head.

14. The shaving system of claim 7, wherein the cover is connected to the guard via one or more hinges.

* * * * *